April 21, 1925.  H. E. RIEHL  1,535,040
AMUSEMENT APPARATUS
Filed May 26, 1923  2 Sheets-Sheet 1
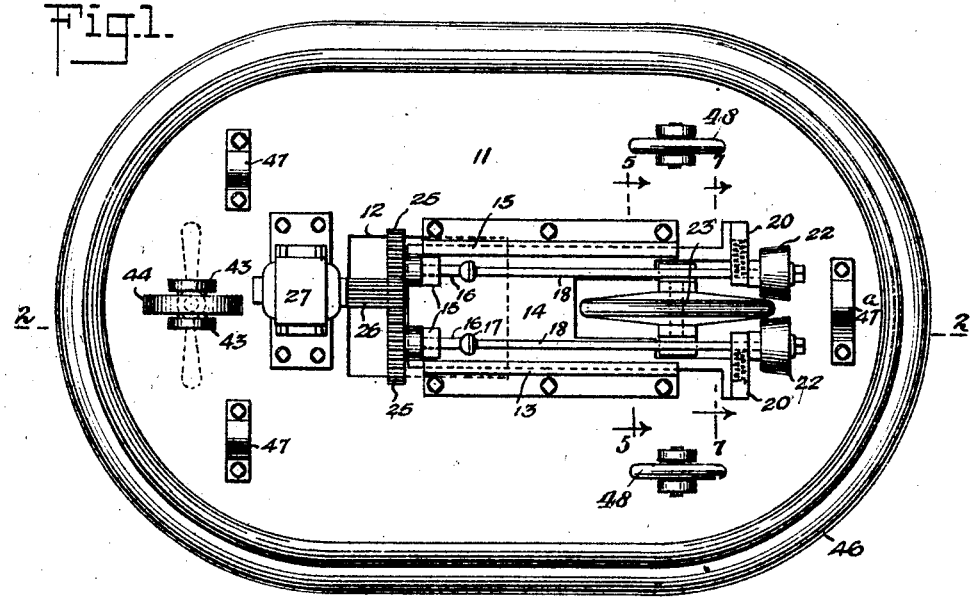
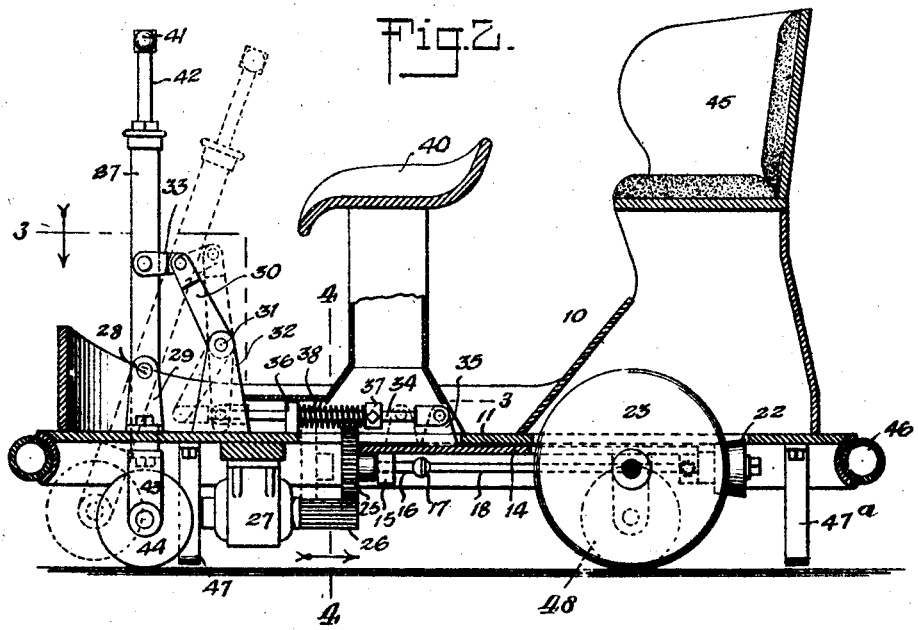
WITNESSES
INVENTOR
HENRY E. RIEHL
BY
ATTORNEYS April 21, 1925.
H. E. RIEHL
AMUSEMENT APPARATUS
Filed May 26, 1923     2 Sheets-Sheet 2
1,535,040
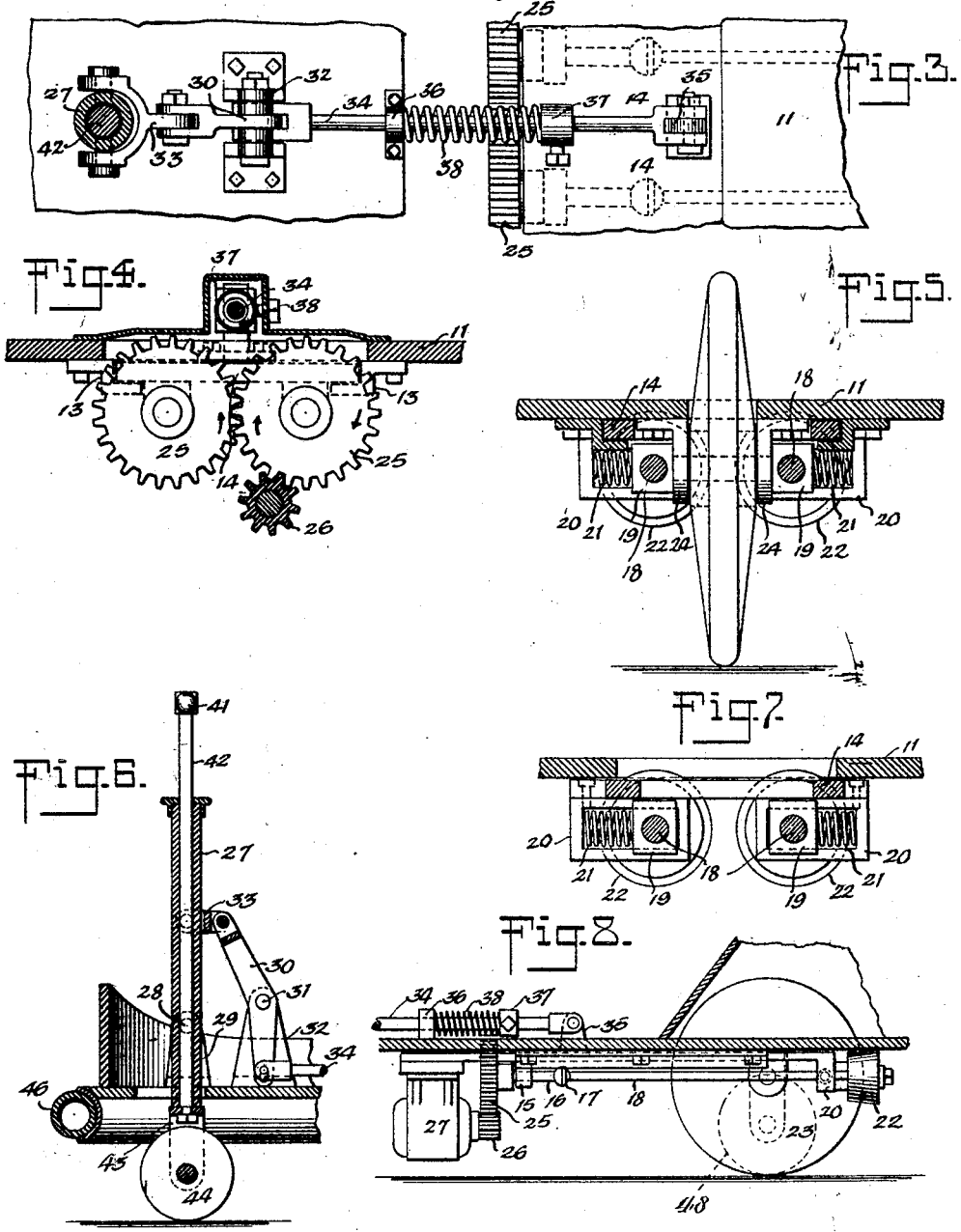
WITNESSES
INVENTOR
HENRY E. RIEHL
BY
ATTORNEYS Patented Apr. 21, 1925.

1,535,040

UNITED STATES PATENT OFFICE.

HENRY ELMER RIEHL, OF BROOKLYN, NEW YORK.

AMUSEMENT APPARATUS.

Application filed May 26, 1923. Serial No. 641,720.

*To all whom it may concern:*

Be it known that I, HENRY ELMER RIEHL, a citizen of the United States, residing in the city of New York, borough of Brooklyn, in the county of Kings and State of New York, have invented a new and useful Improvement in Amusement Apparatus, of which the following is a specification.

My invention has for an object to provide an amusement apparatus consisting of a vehicle having a traction wheel which is driven by means connected with a shaft, the shaft and its means being movable relatively to the body of the vehicle to move the said means into and out of operative position as may be desired.

Another object of the invention is to provide friction discs for the said means which may engage the sides of the traction wheel to drive the latter, the position of the friction discs relatively to the traction wheel serving to vary the speed of the traction wheel. When the friction discs are moved out of engagement with the traction wheel, the traction wheel is no longer driven and the motion of the vehicle is arrested.

Still another object of the invention is to provide a steering means which will not only serve to control the direction of movement of the vehicle but which is connected with means for moving the friction discs relatively to the traction wheel.

Additional objects of the invention will appear in the following specification in which the preferred form of my invention is described:

In the drawings similar reference characters refer to similar parts in all the views in which,—

Fig. 1 is an inverted plan view of the vehicle;

Fig. 2 is a sectional view on the line 2—2 of Fig. 1;

Fig. 3 is an enlarged sectional view on the line 3—3 of Fig. 2;

Fig. 4 is an enlarged sectional view on the line 4—4 of Fig. 2;

Fig. 5 is an enlarged sectional view on the line 5—5 of Fig. 1;

Fig. 6 is a fragmentary sectional view on an enlarged scale showing the steering column and the parts associated therewith;

Fig. 7 is an enlarged sectional view on the line 7—7 of Fig. 1;

Fig. 8 is a fragmentary sectional view illustrating the driving means for the vehicle.

This invention relates to an amusement apparatus in which a vehicle provided with an electric motor is adapted to be driven over an electrically conductive surface which constitutes one conductor for the circuit of the electric motor, the other conductor being constituted by an overhead wire netting or the like with which a trolley pole on the vehicle makes contact. In such a vehicle, power is transmitted from the electric motor to a large friction disc which constitutes the traction wheel of the vehicle through a pair of parallel shafts on which two smaller friction discs are disposed, one on each side of the larger disc, the driving connection being controlled by steering means which is adapted not only to be turned upon its longitudinal axis for steering purposes but is also adapted to be rocked upon a transverse axis for controlling the driving connection.

The object of the invention is to provide improved means for starting, stopping and for varying the speed of the vehicle and to this end the steering means is connected with a frame slidable relatively to the body of the vehicle and the shafts and friction drive discs are carried by said frame so that the rocking of said means may move said discs into and out of driving connection with the larger friction disc serving as a traction wheel. Preferably, the frame is held yieldingly in a pre-determined position by resilient means so as to tend to break the driving connection. If desired, the movement of the said frame may permit the smaller friction discs to travel from the circumference towards the center of the larger disc shown as a traction wheel and by this means to provide a range of speeds for the vehicle.

On referring to the drawings it will be seen that the vehicle 10 has a body 11, this body 11 having an opening 12 in its bottom there being secured to the body 11 and extending into the opening 12, flanges 13 on which a frame 14 is adapted to slide. This frame 14 has bearings 15 in which are journaled shafts 16, these shafts 16 being connected by universal joints 17 with shafts 18 which are journaled in bearings 19, these bearings 19 are mounted in guide-ways 20 secured to the frame 14 and in these guideways, there are springs 21 which serve to move the bearings 19 yieldingly inwardly. Mounted on the shafts 18 at the rear of the bearings 19, there are friction discs 22 which are provided for engagement with a traction wheel 23 which is journaled in bearings 24 secured to the frame 11. Mounted on the forward ends of the shaft 16, there are gears 25 which mesh with a gear 26 mounted on the shaft of a motor 27.

It will be seen by referring to Fig. 1 of the drawings that the gear 26 is sufficiently long to permit of its engagement with one of the gears 25 during the full, normal, longitudinal movement of the frame 14 relatively to the frame 11.

By referring to Fig. 1 of the drawing it will be seen that the gear 26 engages one of the gears 25 and that the two gears 25 engage or mesh with each other. It will therefore be seen that when the motor 27 is connected with a current, that the friction discs 22 will be rotated and that when the frame 14 is moved forwardly relatively to the frame 11, that the friction discs 22 will engage the sides of the traction wheel 26 to operate the latter. It will also be understood that the friction discs will be held in contact with the traction wheel 23 when the frame 14 is moved forwardly relatively to the frame 11 by the springs 21. The speed of the vehicle may be varied by the movement of the friction discs 22 from the circumference of the traction wheel 26 towards its axis.

By referring to Figs. 2 and 6, it will be seen that the steering column 27 is pivoted at 28 to brackets 29 so that the steering column 27 may be moved on a transverse axis. A bell crank lever 30 is pivoted at 31 to brackets 32 mounted on the frame 11 and this bell crank lever 30 is connected with the steering column 27 by a link 33 which is pivoted to the bell crank lever 30 at the opposite sides of the steering column 27. The other arm of the bell crank lever 30 is connected by a rod 34 with a bracket 35 secured to the frame 14. This rod 34 is disposed through a bearing 36 on the frame 11 and on the rod 34 there is secured a collar 37, a spring 38 being disposed between the bearing 36 and the collar 37 to hold the rod 34 yieldingly rearwardly and with it the frame 14 so that the discs 22 will be held out of position with the traction wheel 23 when the steering column 27 is in the position indicated by the full lines in Fig. 2 of the drawings. When the steering column 27 is moved to the position indicated by the dotted lines in Fig. 2 of the drawings and in the direction of the seat 40 mounted on the vehicle, the friction discs 22 will be brought into engagement with the traction wheel 23 and if the current has been turned on to operate the motor 27, the vehicle will be propelled in a manner readily understood and the vehicle will be steered by manipulating the handles 41 on the shaft 42 mounted in the steering column 27 and which has brackets 43 with bearings in which the steering wheel 44 is journaled. When the handles 41 are released, the steering column 27 will return to the position indicated by the full lines in Fig. 2 of the drawings under the influence of the spring 38.

It will be understood that while the motor 27 has been described as being mounted on the vehicle frame 11 that if desired, this motor 27 may be mounted on the frame 14. The vehicle is shown with a front seat 40 and a rear seat 45 but any desired arrangement may be made with reference to the seats on the vehicle to meet special requirements. The frame 11 of the vehicle is provided with a curved periphery in which is secured a cushioning member 46 so that when a plurality of vehicles are employed, the cushioning members 46 will lessen jars and shocks when there is a collision between two vehicles. The vehicle when in operation is preferably supported on two wheels, one the steering wheel 44 and the other the traction wheel 23. Additional supports 47 are secured to the underside of the vehicle frame 11 and depend therefrom to hold the vehicle supported in an inclined position when not in use.

As will best be seen by referring to Figs. 1, 2 and 8 of the drawings, two auxiliary wheels 48 are provided one disposed at each side of the traction wheel 23. When the vehicle is operated with the body 11 in a horizontal plane, the auxiliary wheels 48 will be off the ground, but when necessary the auxiliary wheels 48 will prevent the vehicle from falling to one side. As stated, the side supports 47 will assist the auxiliary wheels 48 in supporting the vehicle when the vehicle is not in use. The rear support 47ª serves to prevent the vehicle from tipping rearwardly.

Having thus described my invention what I claim as new and desire to protect by Letters Patent is:

1. In a vehicle having a traction wheel, a friction disc for movement into engagement with the traction wheel, means for driving the friction disc, a steering column for the vehicle, steering mechanism operable at the steering column and means adapted to be actuated by the steering column independently of the steering mechanism for controlling the movement of the disc relatively to the traction wheel.

2. In a vehicle having a traction wheel, two friction discs positioned for movement into engagement with the sides of the traction wheel, means for driving the friction discs, a pivoted steering column for the vehicle steering mechanism at the steering column and means adapted to be actuated by the steering column independently of the steering mechanism for controlling the movement of the discs relatively to the traction wheel.

3. In a vehicle having a traction wheel, two friction discs positioned for movement into engagement one with each side of the traction wheel, a steering column pivoted to the vehicle body, steering mechanism operable at the steering column and means adapted to be actuated by the steering column independently of the steering mechanism for moving the friction discs relatively to the traction wheel.

4. In a vehicle having a traction wheel and steering means, a bearing, resilient means for moving the bearing in the direction of the plane of movement of the traction wheel, a shaft journaled in the bearing, a friction disc on the shaft for engaging the traction wheels, means connected with the steering means for moving the bearing longitudinally of the plane of movement of the traction wheel.

5. In a vehicle having a traction wheel and steering means, a friction disc for engaging the traction wheel, means for moving the friction disc in the direction of the plane of movement of the traction wheel, and means connected with the steering means for operating the second mentioned means longitudinally of the said plane of movement.

6. In a vehicle having a traction wheel and steering means, a frame mounted to move relatively to the body of the vehicle, two bearings on the frame, one at each side of the plane of movement of the traction wheel, shafts journaled in the bearings, friction discs on the shafts for engaging the traction wheel, means for driving the shafts and means connected with the steering means for moving the frame relatively to the body of the vehicle.

7. In a vehicle having a traction wheel, a frame mounted to move relatively to the body of the vehicle, two bearings on the frame one at each side of the plane of movement of the traction wheel, shafts journaled in the bearings, friction discs on the shafts for engaging the traction wheel, means for driving the shafts, a steering column pivoted to the body of the vehicle and means adapted to be operated by the steering column for moving the frame relatively to the body of the vehicle.

8. In a vehicle having a traction wheel, a bearing, resilient means for moving the bearing in the direction of the plane of movement of the traction wheel, a shaft journaled in the bearing, a friction disc on the shaft for engaging the traction wheel, a steering column pivoted to the body of the vehicle and means operable by the steering column for moving the bearing longitudinally of the plane of movement of the traction wheel.

9. In a vehicle having a traction wheel, a friction disc for engaging the traction wheel, means for moving the friction disc in the direction of the plane of movement of the traction wheel, means for driving the friction disc, a steering column for the vehicle and means operable by the steering column for moving the friction disc longitudinally on the said plane of movement.

10. In a vehicle having a traction wheel and steering means, a frame slidable on the body of the vehicle, bearings on the frame at each side of the plane of movement of the traction wheel, shafts journaled in the bearings, means to drive the shafts, friction discs on the shaft and means connected with the steering means to move the frame relatively to the body of the vehicle to engage the traction wheel with the friction discs.

11. In a vehicle having a traction wheel and steering means, a motor having a shaft mounted on the vehicle, a frame slidable on the body of the vehicle, bearings on the frame at each side of the plane of movement of the traction wheel, shafts journaled in the bearings, means to drive the shafts, friction discs on the shafts, means connected with the steering means to move the frame relatively to the body of the vehicle to engage the traction wheel with the friction discs and means by which the motor shaft is adapted to drive the second mentioned shafts.

12. In a vehicle having a traction wheel, a friction disc for movement into engagement with the traction wheel, means for driving the disc, a steering column pivoted to the body of the vehicle, steering mechanism operable at the steering column and means adapted to be actuated by the steering column independently of the steering mechanism for controlling the movement of the disc relative to the traction wheel.

13. In a vehicle having a traction wheel, a frame mounted to move relatively to the body of the vehicle, two bearings on the frame, one at each side of the plane of movement of the traction wheel, shafts journaled in the bearings, friction discs on the shafts for engaging the traction wheel, a steering column pivoted to the body of the vehicle, means adapted to be operated by the steering column for moving the frame relatively to the body of the vehicle, a steering wheel and means disposed in the steering column for operating the steering wheel.

14. In a vehicle having a traction wheel, a frame slidable on the body of the vehicle, a bearing on the frame, a shaft journaled in the bearing, means to drive the shaft, a friction disc mounted on the shaft for engaging the traction wheel, resilient means for holding the frame in a pre-determined position relatively to the body of the vehicle, a pivoted steering column and means connected with the steering column for moving the frame against the tension of the said resilient means.

15. In a vehicle having two wheels, one a traction wheel and the other a steering wheel, a friction disc for engaging the traction wheel, means for driving the friction disc, a pivoted steering column having means connected with the steering wheel for controlling the latter and means adapted to be actuated by the steering column for moving the friction disc relatively to the traction wheel.

16. In a vehicle having two wheels, one a traction and the other a steering wheel, a friction disc for engaging the traction wheel, means for driving the friction disc, a steering column mounted on the body of the vehicle and movable relatively thereto, means connected with the steering column for controlling the steering wheel, and means adapted to be actuated by the steering column for moving the friction disc into engagement with the traction wheel.

HENRY ELMER RIEHL.